Oct. 12, 1926.
L. E. KAMPS
1,602,533
FINGER RING TWINE CUTTER
Filed Dec. 12, 1925
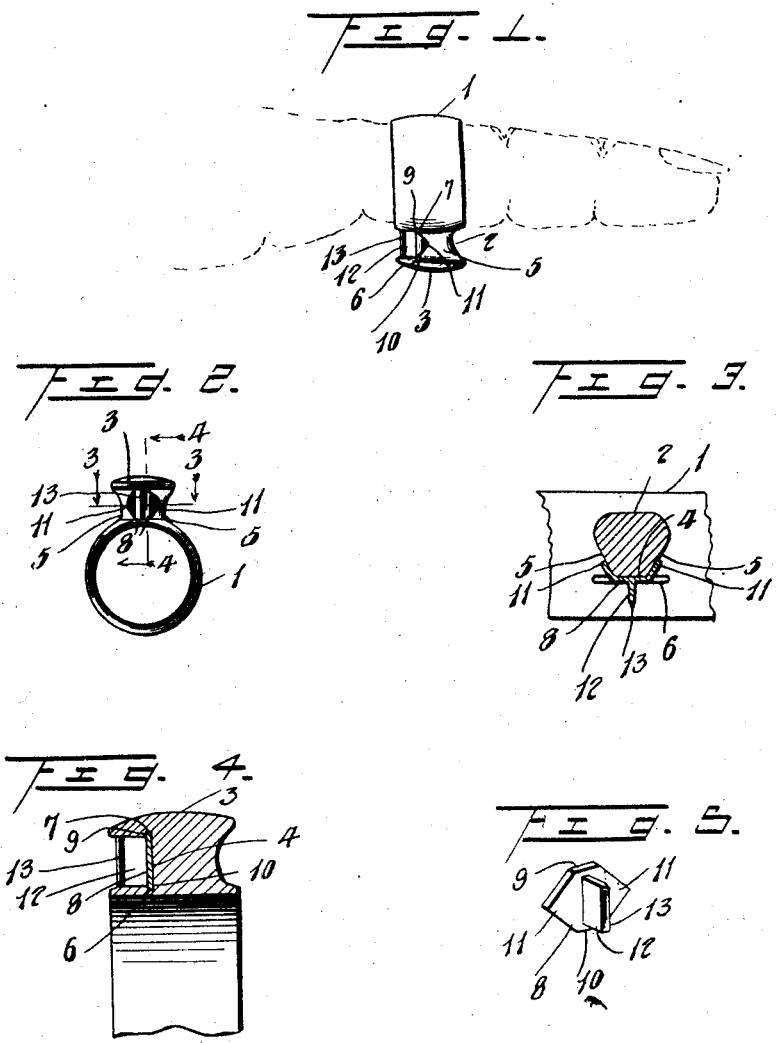
Inventor
L. E. Kamps.

Patented Oct. 12, 1926.

1,602,533

UNITED STATES PATENT OFFICE.

LEO E. KAMPS, OF VERMILION, OHIO.

FINGER-RING TWINE CUTTER.

Application filed December 12, 1925. Serial No. 75,055.

The invention relates to jewelry novelties and has for its object the provision of a finger ring provided with a shank and a head on the shank that may be shaped as a decoration for the ring, the twine cutting feature being a removable blade slidably mounted in grooves in the ring and head, the cutting blade being provided with ends adapted to be bent into engagement with the shank to hold the cutting member in engagement with the ring, this structure providing for replacement of a dull blade.

The invention will be described in detail hereinafter, and will be found illustrated in the accompanying drawings, in which—

Figure 1 is a side view of the finger ring twine cutter showing it in position on the finger, Figure 2, a front view in elevation of the ring, Figure 3, an enlarged detail sectional view on a plane indicated by the line 3—3 of Figure 2, Figure 4, a similar view on a plane indicated by the line 4—4 of Figure 2, and Figure 5, a view in perspective of the cutting implement.

In the drawings similar reference characters will be used to designate corresponding parts throughout the several views.

The invention is, as heretofore stated, a jewelry novelty comprising a finger ring 1 that may be made of any suitable material such for instance as the precious metals, or aluminum, or other base metals, and has an outwardly extending shank 2, and a head on the shank 3 that may be shaped, as heretofore stated, as a decoration of the ring, into a heart, or other suitable form. The shank 2 has a flat front face 4 and side faces 5 that are flared outwardly from the end of the front face 4.

The ring 1 is provided with a groove 6 adjacent to the front face 4 of the shank, and the head 3 is provided with a similar groove 7 oppositely disposed to the groove 6, and these grooves are provided to slidably engage a cutting member to be hereinafter described.

The cutting member comprises a base 8 having upper and lower edges 9 and 10 respectively to engage the grooves 6 and 7, and the ends tapered to points as shown at 11. A vertically disposed blade 12 is formed integral with the base 8 and has its outer edge sharpened to a point as shown at 13. The blade portion 12 is of hardened steel, while the base is of soft metal, so that the tapered ends 11 may be bent as shown in Figures 1, 2, and 3 to engage the sides 5 of the shank 2 when the blade is in position to retain it in position, and are capable of being straightened when it is desired to remove the cutting member 8 to replace the cutting member with a sharpened one.

What is claimed is:—

1. In a finger ring, a shank projecting therefrom, a head on said shank, the ring and head having oppositely disposed grooves, and a cutting member slidably engaging said grooves and adapted to be bent to engage the shank to hold the member in fixed relationship therewith.

2. In a finger ring, a shank projecting therefrom having a flat front portion and sides flared outwardly therefrom, a head on said shank, the ring and head having oppositely disposed grooves, a cutting member slidably engaging the grooves and having pointed ends adapted to be bent into engagement with the outwardly flared sides of the shank.

3. In a finger ring, a shank projecting therefrom, a head on said shank, the ring and head having oppositely disposed grooves, a cutting member slidably engaging said grooves, said cutting member comprising a base of bendable material, and an offset blade of hardened material, and the ends of said base being adapted to be bent into engagement with the shank to hold the blade in engagement with the ring.

In testimony whereof I affix my signature.

LEO E. KAMPS.